Nov. 24, 1959 R. W. KRITZER 2,913,806
FABRICATION OF HEAT TRANSFER UNITS
Filed Nov. 22, 1954 11 Sheets-Sheet 1

Fig. I.

Inventor
Richard W. Kritzer
By Fred Gerlach
Attorneys

Nov. 24, 1959

R. W. KRITZER

2,913,806

FABRICATION OF HEAT TRANSFER UNITS

Filed Nov. 22, 1954

Nov. 24, 1959 R. W. KRITZER 2,913,806
FABRICATION OF HEAT TRANSFER UNITS
Filed Nov. 22, 1954 11 Sheets-Sheet 4

Inventor:
Richard W. Kritzer
By: Fred Gerlach
his Atty.

Nov. 24, 1959  R. W. KRITZER  2,913,806
FABRICATION OF HEAT TRANSFER UNITS
Filed Nov. 22, 1954  11 Sheets-Sheet 5

Nov. 24, 1959    R. W. KRITZER    2,913,806
FABRICATION OF HEAT TRANSFER UNITS
Filed Nov. 22, 1954    11 Sheets-Sheet 7

Inventor
Richard W. Kritzer
By Fred Gerlach
Atty

United States Patent Office 2,913,806
Patented Nov. 24, 1959

2,913,806

FABRICATION OF HEAT TRANSFER UNITS

Richard W. Kritzer, Chicago, Ill.

Application November 22, 1954, Serial No. 470,379

1 Claim. (Cl. 29—33)

The invention relates to apparatus for and methods of fabricating heat-exchangers which include tubing with attached cross-fins.

The objects of the invention are to provide: a method of and apparatus for, assembling coils of tubing and a series of sections of fin-stock from a series of rolls of great length into an interlocked fin-and-coil structure, which is severable between the coils to form individual heat transfer units; apparatus for and a method of producing from consecutive sections of fin-stock of great length, and unitary coils of tubing with members, extending through the fins and bends serially connecting said members, in rapid succession a continuous fin-and-coil structure which is serially severable into individual heat-transfer units; apparatus for feeding fin-stock from reels to the assembling apparatus; means for intermittently confining and advancing complemental areas of the series of strips for consecutively piercing, and the placement of coils of tubing in said areas; improved mechanism for shifting one of the die-structures into and out of mating relation with the other; and improved mechanism for severing the strips of fin-stock; improved tools for piercing the strips of fin-stock with surrounding tongues.

Other objects will appear from the detail description.

The invention consists in the several novel features which are hereinafter set forth and are more particularly defined by the claim at the conclusion hereof.

The invention involves a method of expeditious fabrication of heat-transfer units which include a unitary coil of tubing and cross-fins secured and spaced on the tubing in spaced planar and heat exchange relation. To expedite the assembly of the units, a series of continuous strips or rolls of suitable fin-stock, for example 5000 ft. in length corresponding in number to the fins required in each unit, is provided and sections corresponding to the length of the fins desired are cut from the entire series of strips to provide the fins for the entire unit. The strip-sections are serially or consecutively cut from the long strips after complete coils of tubing have been assembled therewith to complete the fabrication of the units. Complete coils of prefabricated tubing, each including straight reaches and connecting bends, are placed sidewise and secured in open-sided holes or slots in the strips for producing the units. The strips are pierced or cut to receive the coils and the coils are assembled successively with sections of the strips. The sections of the strips with the coils secured therein are severed transversely of the strips between the coils to fabricate the units each with a unitary coil and a predetermined number of cross-fins of predetermined length are fabricated in consecutive succession without any manual labor in assembling the fin-stock in spaced relation. This method results in low-cost fabrication and is particularly advantageous when a large number of fins in closely spaced relation are used.

The apparatus exemplifying the invention comprises generally: means for supplying a series of continuous rolls of strips of fin-stock in number corresponding to the total number of fins in the unit to be fabricated, and of great length, for example, 5000 ft. for the consecutive fabrication of a great number of units, or without replenishing the supply; means for successively advancing the entire series of strips; upper and lower die-structures or combs in which the strips of fin-stock are confined; mechanism for piercing the series of strips while confined in said structures to cut notches or holes along and intersecting one edge of all of the strips for receiving, sidewise, a complete coil of tubing, and to cut tongues surrounding the notches; mechanism for retracting the upper die-structure to expose the pierced strips in the lower die-structure so that a coil can be deposited sidewise into the slots in the strips; mechanism for conjointly advancing the series of strips and the coil held therein; mechanism for deforming the tubing in the notches in the strips to interlock the coil and the strips in planar spaced relation; mechanism for stripping the coil and strips from the lower die-structure while the latter is retracted without retracting the strips; apparatus for gripping the strips to hold them against retraction; and mechanism for severing sections from the strips, each including a complete coil and cross-fins to form a complete heat transfer unit.

This apparatus is adapted for operations to fabricate consecutively the cross-fins for a continuous series of units, each with a coil secured therein without interruption until the rolls of the strips have been used.

*Supply of fin-stock.*—The apparatus comprises a supply of strips of fin-stock in rolls of great length for the fabrication of the fins of a large number of heat-transfer units. The number of rolls corresponds to the predetermined number of fin in each unit and a section from each roll is used for each unit. This supply is exemplified by rolls of strips 40 of fin-stock of the width of the fins desired and wound on reels 41. The invention also comprises mechanism for intermittently feeding the strips 40 to the die-structures. A structure for supporting the reels 41 and said mechanism comprises end-frames 43 and 44, intermediate frames 45, longitudinal rails 47 and cross-bars 48 secured together. A table 50 is mounted on this supporting structure. The reels 41 are mounted in side-by-side relation along both sides of the supporting structure for compactness in arrangement for the large number necessary for heat-transfer units. Each reel 41 is suspended and pivotally and demountably supported in a yoke 52 which is provided with angular slots 53 in which the spindle 54 of the reel is removably supported. The upper cross-member 55 of each yoke 52 is demountably supported on the horizontal flange of one of the longitudinal bars 47 which are slotted to receive the depending legs of the yoke. Pins 56 hold the yokes for individual removal and replacement when reloading the reels. The strips 40 on the reels 41 at one side of the table 50 pass from said reels over a feed-roll 60 and the strips on reels 41 at the opposite side of table 50 pass over a feed-roll 61 to the top of table. The strips 40 are twisted and guided by rollers 63 which are mounted on vertical axes on the top of the table 50, to travel individually and edgewise over said table to channels in the upper and lower die-structures hereinafter described.

Figure 1:
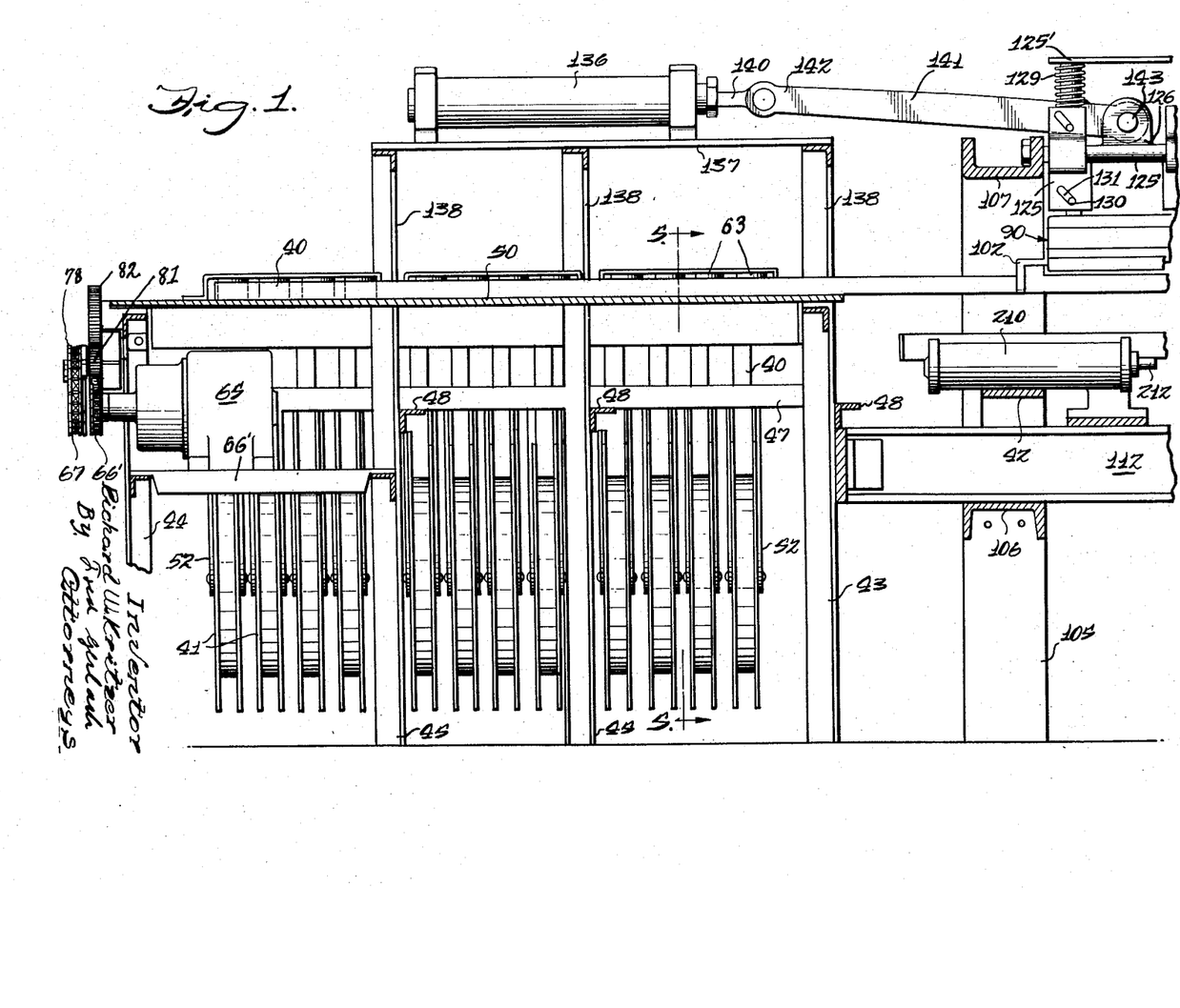
Fig. 1 is a vertical longitudinal section taken on line 1—1 of Fig. 3 of the apparatus for suppling continuous strips of metal for forming the fins to the mechanism for assembling the fins and tubing.

*Mechanism for advancing the strips of fin-stock.*—The strips 40 of the entire series are simultaneously and individually guided from table 50 to the die-structures, and their leading portions are intermittently advanced between piercing operations by the advance strokes of the lower die-structure after the coil of tubing has been inserted in notches in the strips as hereinafter described. Mechanism for unwinding the strips 40 from reels 41 when the lower die-structure is advanced, comprises: an electric motor 65 (Fig. 1) which is supported on bars 66 under the table 50; and a pair of sprocket wheels 66 and 67 on the shaft of said motor; and gearing connected to drive the rolls 60 and 61 respectively. The gearing for driving roll 61 comprises: a sprocket chain 68 driven by sprocket wheel 67, a sprocket wheel 69 driven by chain 68 and mounted on a shaft 70, a sprocket wheel 71, and a sprocket wheel 73 driven by chain 72 and fixed to the shaft 74 of roll 61. The gearing for driving feed-roll 60 from sprocket wheel 66, comprises: a sprocket chain 78 driven by wheel 67, a sprocket wheel 79 driven by chain 78 and mounted on a shaft 80, a spur gear 82 rotatable with sprocket 79 and meshing with a gear 82 which is secured on the shaft 83 of roll 60. The shaft 74 of feed-roll 61 is journalled in a bearing 86 on end-frame 43 and a bearing 87 on end-frame 44. The shaft 83 of feed-roll 60 is journalled in a bearing 88 on end-frame 43 and a bearing 89 on end-frame 44. The feed-rolls 60 and 61 are driven to unwind the strips 40 from the reels 41 so that the portions of said strips over the table 50 and between said rolls and the assembling mechanism can be intermittently advanced by the lower die-structure. The feed-rolls 60 and 61 are continuously driven from motor 65. When the lower die-structure with a coil in the strips is advanced after each piercing operation, the strips will become taut around the feed-rolls 60 and 61 and the traction between said rolls and the strips will pull the strips 40 from the reels 41 to the table 50. Between advancing strokes of the lower die-structure no pull is exerted on portions of the strips over the table and there is no traction between the feed-rolls and the strips. As a result, the feed-rolls will then run idly or without pull on the strips. In this manner, the feed-rolls automatically control the unrolling of the strips 40 from the reels to the table 50 except when and at the rate at which the strips are advanced by the lower die-structure.

*The die or comb structures.*—A lower die or comb structure generally designated 91 and a coacting upper-die or comb structure generally designated 90 individually support the strips 40 in planar and spaced relation during the piercing of said strips for sidewise insertion of the coils of tubing in notches pierced in the strips.

The lower die-structure 91 comprises a bed or frame 97' and a planar series of die-plates 93 separated by spacers 94, all of which are fixedly secured on frame 97'. These die-plates and spacers define channels in which the lower portions of the strips 40 are individually confined in the spaced relation of the fins in the assembled heat transfer units. These channels are sufficient in number to confine strips of the maximum number of fins in the units to be fabricated and extend from the front to the rear ends of die-structure 91 to permit relative longitudinal sliding movement of said structure and strips 40. The upper edges of die-plates 93 are provided with a sufficient number of rows of semi-circular notches 95 to receive the straight reaches 191 between the connecting bends 192 of a coil of tubing 190.

The upper die-structure 90 comprises a bed or frame 98, and a planar series of die-plates 96 and alternating spacers 97, all secured on said frame. Plates 96 are adapted to register vertically with die-plates 93 and are provided on their lower edges with semi-circular notches 99 which register vertically and mate with the notches 95 in die-plates 93 to function as circular female dies for coacting with a cylindrical piercing tool as hereinafter described. The upper edges of spacers 97 and the lower edges of spacers 94 when the die-plates 93 and 96 are in coacting and abutting relation, confine the strips 40 against vertical movement. The lower edges 100 of plates 96 are bevelled. The upper edges of the spacers 94 and the lower edges of spacers 97, position the strips vertically in the die-structures so that the upper edges of the strips 40 will interseat the circular female die openings above their vertical centers and below their upper arcs so that the piercing tools will cut notches or holes 155 which are open and contracted at the upper edges of strips 40. The die-plates and spacers in both die-structures extend continuously between and are open at their front and rear ends to permit relative longitudinal sliding movement of strips 40 and said structures. The die-plates 97 in the upper die-structure 90 have rearward and downward extensions 102 (Fig. 2) for spacing and individually guiding the strips 40 from the table 50 to the channels in the lower die-structure 91. The strips 40 pass and are guided from table 50 into and through the channels between the die-plates 93 in structure 91 under the platen 92 and to mechanism for severing the strips 40 between the coils of tubing.

The structure 90 is movable horizontally forward into vertical registration with structure 91 for a piercing operation, and rearward thereof to expose the notches 95 in the die-plates 93 for the placement of coils into said notches. Structure 90 is also movable vertically to lower it into coacting relation with the die-structure 90, and to raise it so that the die-plates 96 will clear the tongues cut in the strips for retraction. Structure 91 is movable horizontally forward to advance the strips 40 and the coils laid in the notches cut therein and also to position the strips and coils for deformation by the platen 92, and is movable rearward to retract structure 91 into position for a piercing operation.

*Shifting mechanism for the die-structures.*—The die-structures are movably supported on a rigid structure which comprises: an arched frame 105 including a cross-beam 106 and a top member 107; an arched frame 108 with cross-members 109 and 110 and a top-member 111; and longitudinal beams 112 fixedly secured to cross-beams 106 and 109 and to the end-frame 43 under the table 50.

The die-structure 91 is supported for horizontal sliding movement by rollers 115 and 116 and rails 114 which are fixed to the frame 97 of said die-structure, and have V-shaped grooves which the rollers engage. Rollers 115 are journalled in bearings 117 which are mounted on a cross-bar 118, and rollers 116 are journalled in bearings 119 mounted on a cross-bar 120. Said rails and rollers support structure 91 for horizontal reciprocation between the position shown in full line in Fig. 2 and its operative position under ram 92. The apparatus for shifting die-structure 91 comprises a fluid pressure operable device which includes an air-cylinder 122 which is stationarily supported on the beams 112, and a stem 123 fixed to a piston in said cylinder and having its rear end fixedly secured to the frame 97' of die-structure 91. This device is adapted to shift die-structure 91 forwardly from the position shown in full lines in Fig. 2 into operative relation with platen 92 and to retract it to said position. Adjustable stops 124 on a fixed bracket 124' (Fig. 33) arrest said structure in its advanced position. A valve 122a (Fig. 34) controls the supply of air to the opposite ends of cylinder 122. When compressed air is admitted to the rear end of cylinder 122, and exhausted from its front end, structure 91 will be shifted forwardly until it is arrested by stops 124 and when the air is reversed, structure 91 will be retracted to its alternative position.

The die-structure 90 is slidably supported for horizontal travel to and from its operative position over the structure 91, on a pair of rods 125 which extend between and are supported on cross-members 107 and 110, a cross-head 126 which is slidable on rods 125, and a series of upstanding posts 127 which are fixed on the frame 98 of die-structure 90. Posts 127 are also slidable vertically in cross-head 126 for lowering the die-plates 96 between the strips 40 in structure 91 and to register or mate the notches 99 in plates 96 with the notches 95 in plates 93 and also to raise the plates 96 above the strips 40. The posts 125 are connected to cross-head 126 by pins 130 on said posts and cam-slots 131 into which the pins extend. Normally, the structure 90 is held raised in cross-head 126 by springs 129 which urge the pins 130 into the upper and rear ends of slots 131. The posts 127 at each side of cross-head 126 are connected together by bars 125'. Forward horizontal movement of said cross-head, will, through pins 130, move said structure forwardly until it registers vertically with the lower die-structure 91. Stops 144 on stationary beam 110 are adapted to then arrest the forward movement of posts 127 until the cross-head travels to the end of its forward stroke. During this arrest of the cross-head 126, limited continued movement is imparted to the cross-head, and cam-slots 131 will force the pins 130 rectilinearly downward until the die-plates 96 are in coacting relation with die-plates 93. During initial retraction of cross-head 126, the springs 129 will raise structure 90 above structure 91 and the strips 40 therein. During continued retraction of cross-head 126, the structure 90 will move horizontally to the position shown in Fig. 2.

Figure 2:
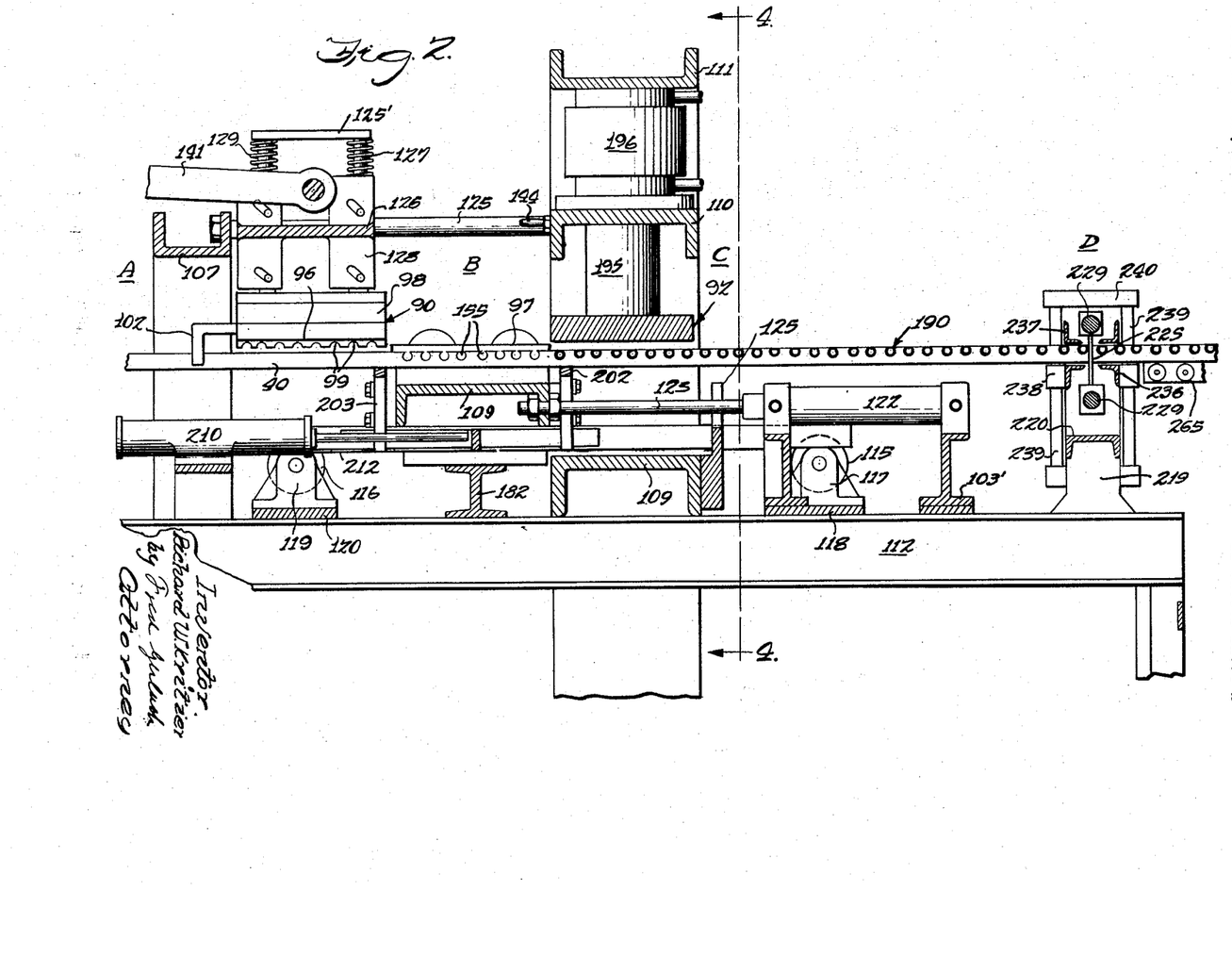
Fig. 2 is a vertical longitudinal section of the mechanism for assembling the fins and tubing.
Figure 3:
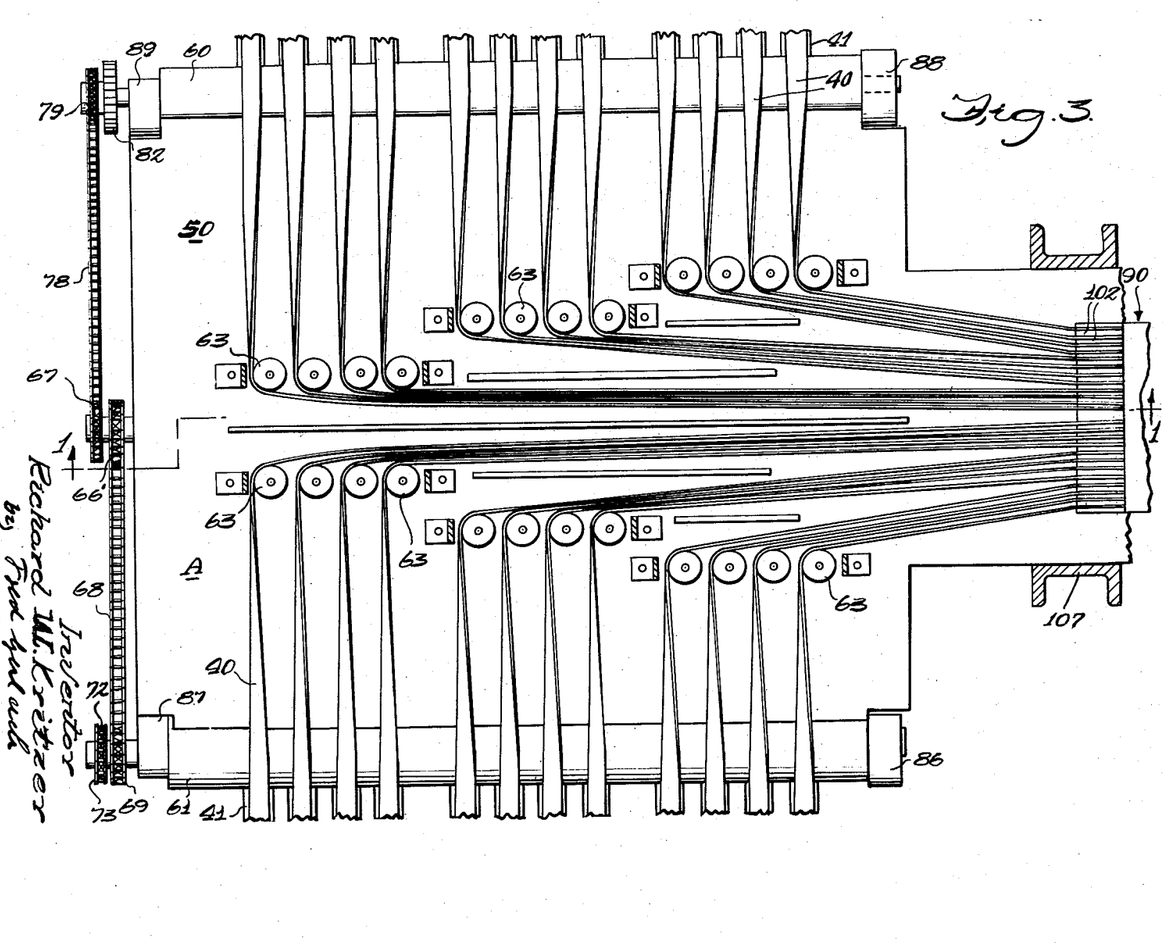
Fig. 3 is a plan view, parts being shown in section, of apparatus for supplying continuous strips of metal from which the fins are successively cut, for assembly of successive zones of the strips with coils of tubing.
Figure 4:
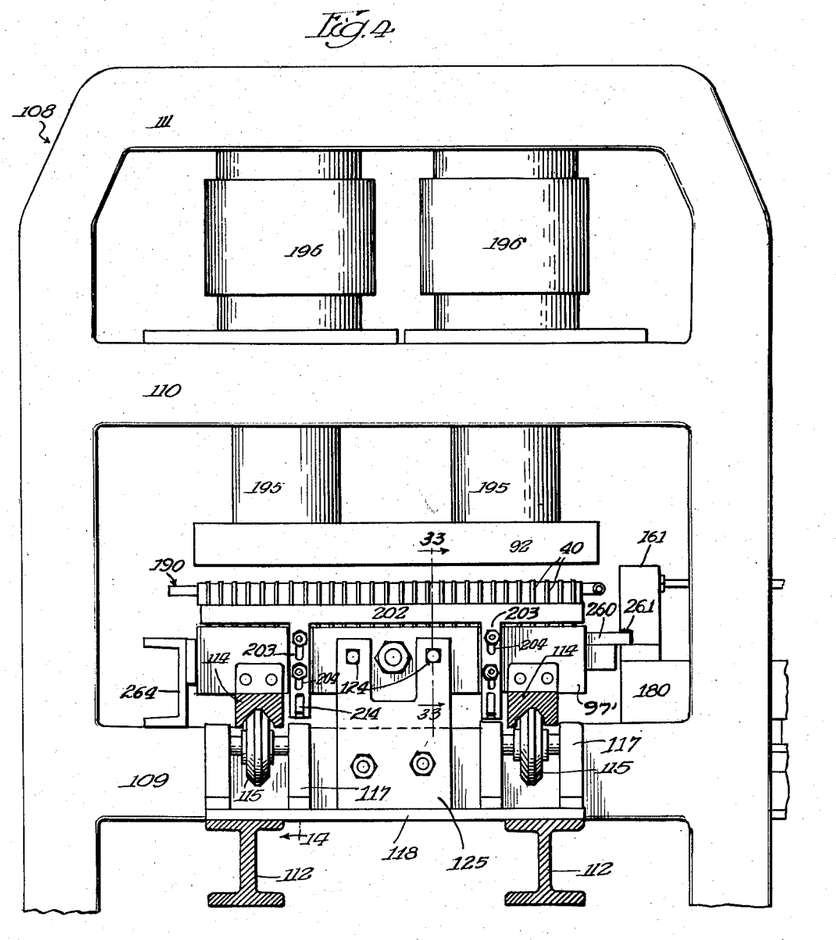
Fig. 4 is a section taken on line 4—4 of Fig. 2.
Figures 5, 6, 7, 8:
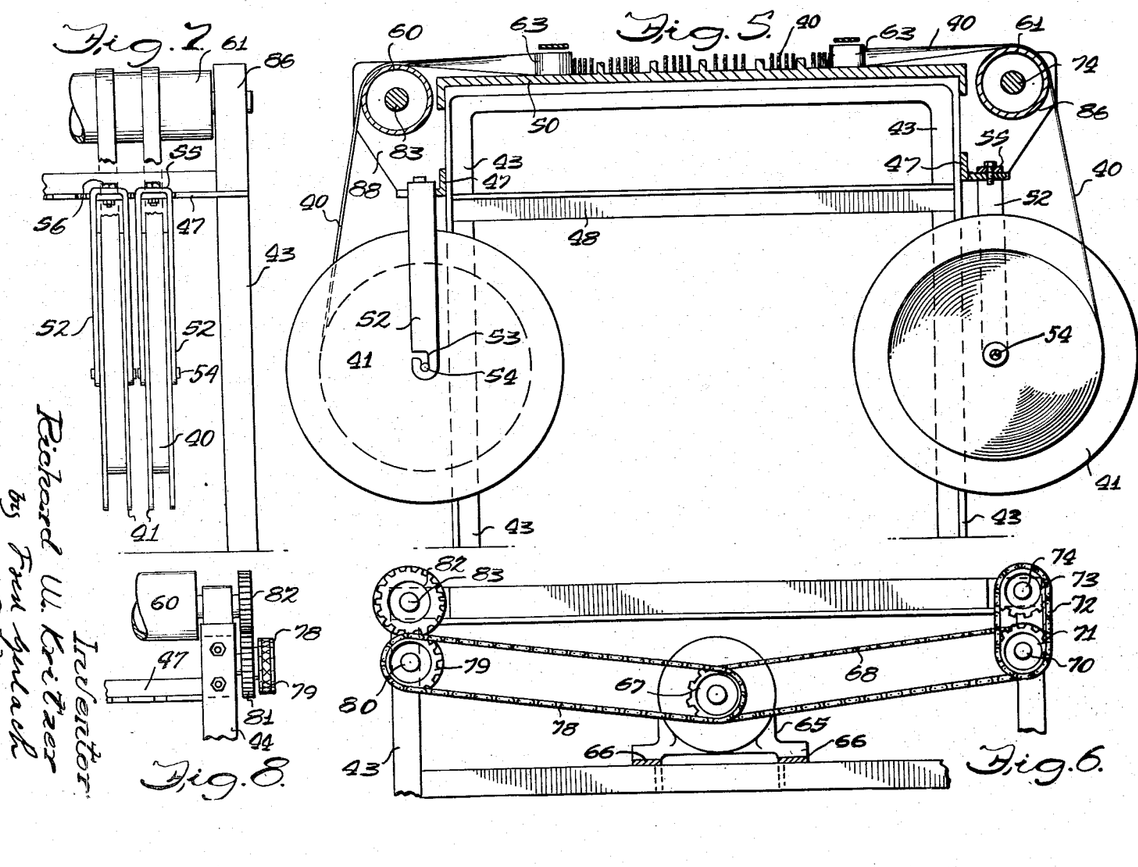
Fig. 5 is a section taken on line 5—5 of Fig. 1.
Fig. 6 is an end view of the gearing for driving the rolls for feeding the strips of metal to the assembly mechanism.
Fig. 7 is a side-elevation of a portion of one of the feed rolls and several of the reels on which the strips are coiled.
Fig. 8 is a side elevation of the gearing for driving one of the feed rolls.
Figure 9:
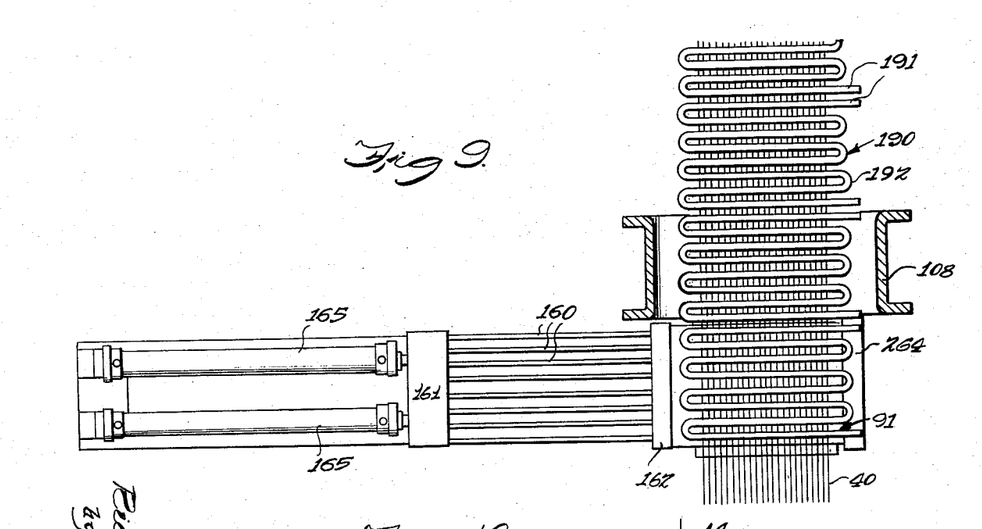
Fig. 9 is a plan view of the mechanism for piercing the strips for receiving the tubing.
Figure 10:
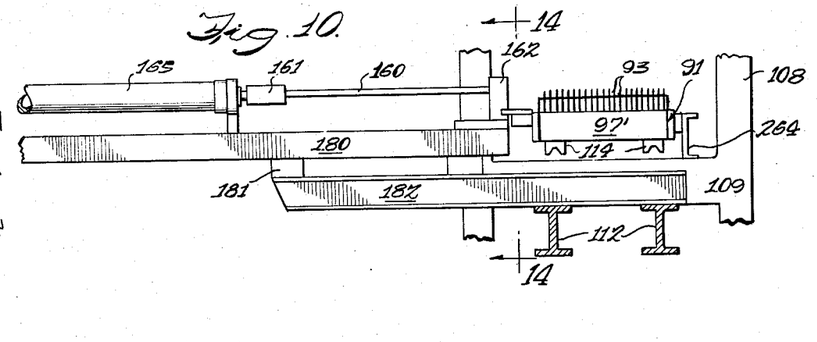
Fig. 10 is a side elevation of said piercing mechanism.
Figure 11:
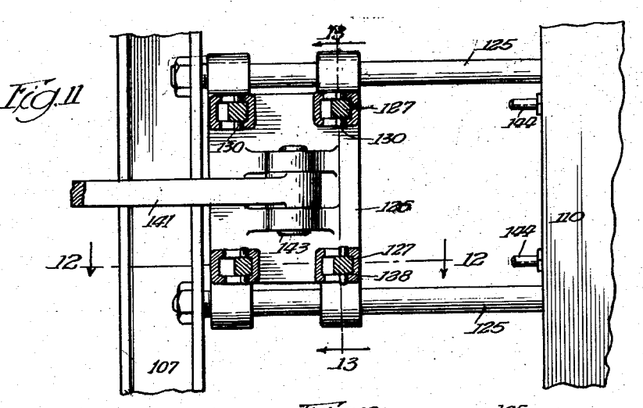
Fig. 11 is a plan view, parts being shown in section, of the mechanism for shifting the upper die-structure into and out of operative relation with the lower die-structure.
Figure 12:
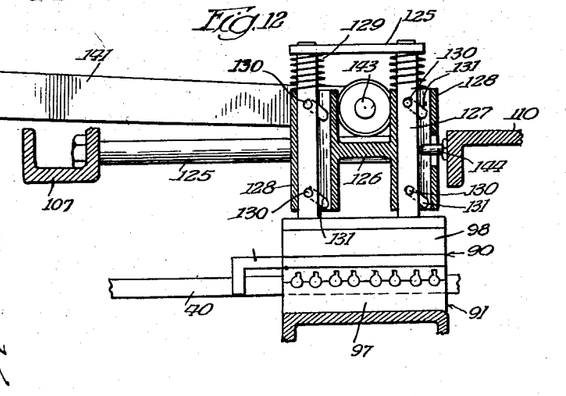
Fig. 12 is a section taken on line 12—12 of Fig. 11.
Figure 13:
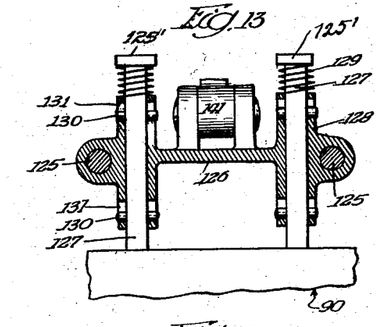
Fig. 13 is a section taken on line 13—13 of Fig. 11, the uper die-structure being in its operative position on the lower die-structure.
Figure 14:
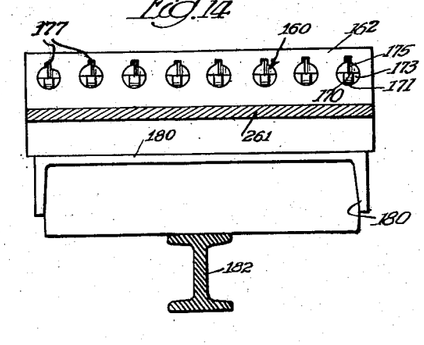
Fig. 14 is a section taken on line 14—14 of Fig. 9.
Figure 15:
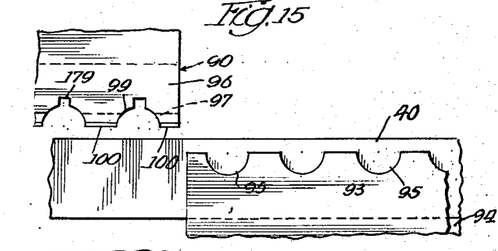
Fig. 15 is a vertical detail section of portions of the upper and lower die-structure showing the upper structure retracted and raised from the lower structure.

Fluid-pressure apparatus for shifting cross-head 126 and structure 90 comprises: an air cylinder 136 supported on a beam 137 which is supported on members 138 which are fixed to end-frame 43 and frames 45; a piston in said cylinder on a stem 140 and a connecting rod 141 which is pivoted at 142 to stem 140 and at 143 to the cross-head 126. Studs 144 function as abutments for shifting the structure 91 relatively to the cross-head at the end of the forward stroke of connecting rod 141. During the outstroke of stem 140, cross-head 126 will slide forwardly on rods 125 and the posts 127 will move with said cross-head. The springs 129 will hold posts 127 and structure 90 raised, as shown in Fig. 2, during the forward movement of cross-head 126 until the posts 127 are arrested by studs 144 and the notches 95 of die-plates 93 and plates 99 of die-plates 96 are in vertical registry. The forward movement of the cross-head 126 is continued and cam-slots 131 in said cross-head will then force pins 130 downwardly and lower the posts 127 until the lower edges of die-plates 96 meet the upper edges of die-plates 93. The die-plates will then be in coacting relation for a piercing operation. During retraction of cross-head 126, its initial movement will be relative to the posts 127 and cross-head will lift die-plates 96 to clear the strips 40 before horizontal retractile movement is imparted to the structure 90. When structure 90 is retracted, the die-structure 91 will be exposed for placement of a coil of tubing in the notches cut in the strips 40. This operation of die-structure 91 is controlled by a valve 150. When compressed air from valve 150 is admitted to the front end of cylinder 136 and air is exhausted from the rear end of said cylinder, the stem 140 will advance the cross-head 126 as aforesaid to advance and lower the die-structure 90. When air from valve 150 is admitted to the front end of cylinder 136 and exhausted from its front end, said structure will be first raised and then horizontally retracted to the position shown in Fig. 2.

Figures 16, 17, 19, 20:
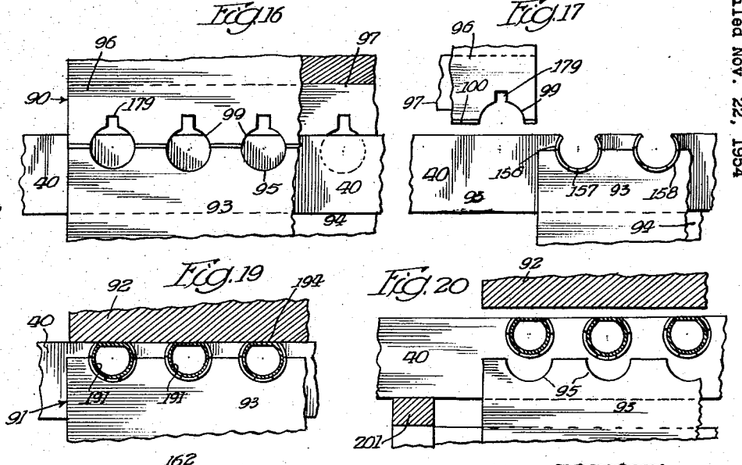
Fig. 16 is a detail section of portions of the die-structures relatively positioned for holding the strips of fin-stock for piercing operations.
Fig. 17 is a detail section of portions of the die-structures after a piercing operation, and after the upper die-structure is raised to clear the lower die-structure for retraction of the upper structure.
Fig. 19 is a detail section of the lower die-structure with the tubing fattened in the hole in said strips by the platen for that purpose.
Fig. 20 is a detail section showing the strips raised in the lower die-structure to permit retraction of said structure independently of said strips.
Figures 23, 24, 25, 26, 27, 28, 29:
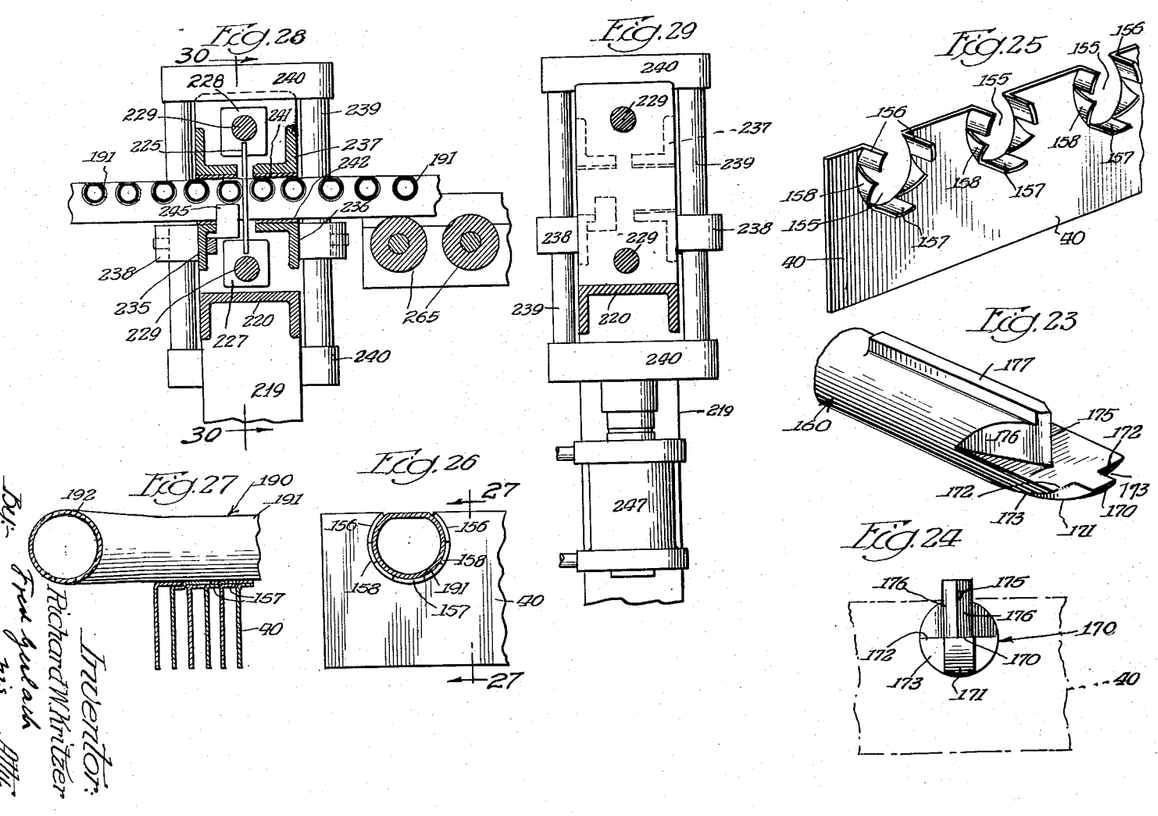
Fig. 23 is a perspective of cutting end of the piercing tool.
Fig. 24 is an end view of said tool.
Fig. 25 is a perspective of a portion of a fin illustrating the contour of the hole and tongues cut thereon by the piercing tool.
Fig. 26 is a section through a section of the tubing between the fins.
Fig. 27 is a section taken on line 27—27 of Fig. 26, a portion of the tubing of a heat transfer unit shown in elevation.
Fig. 28 is a section taken on line 28—28 of Fig. 30.
Fig. 29 is a section taken on line 29—29 of Fig. 30.
Figures 30, 31:
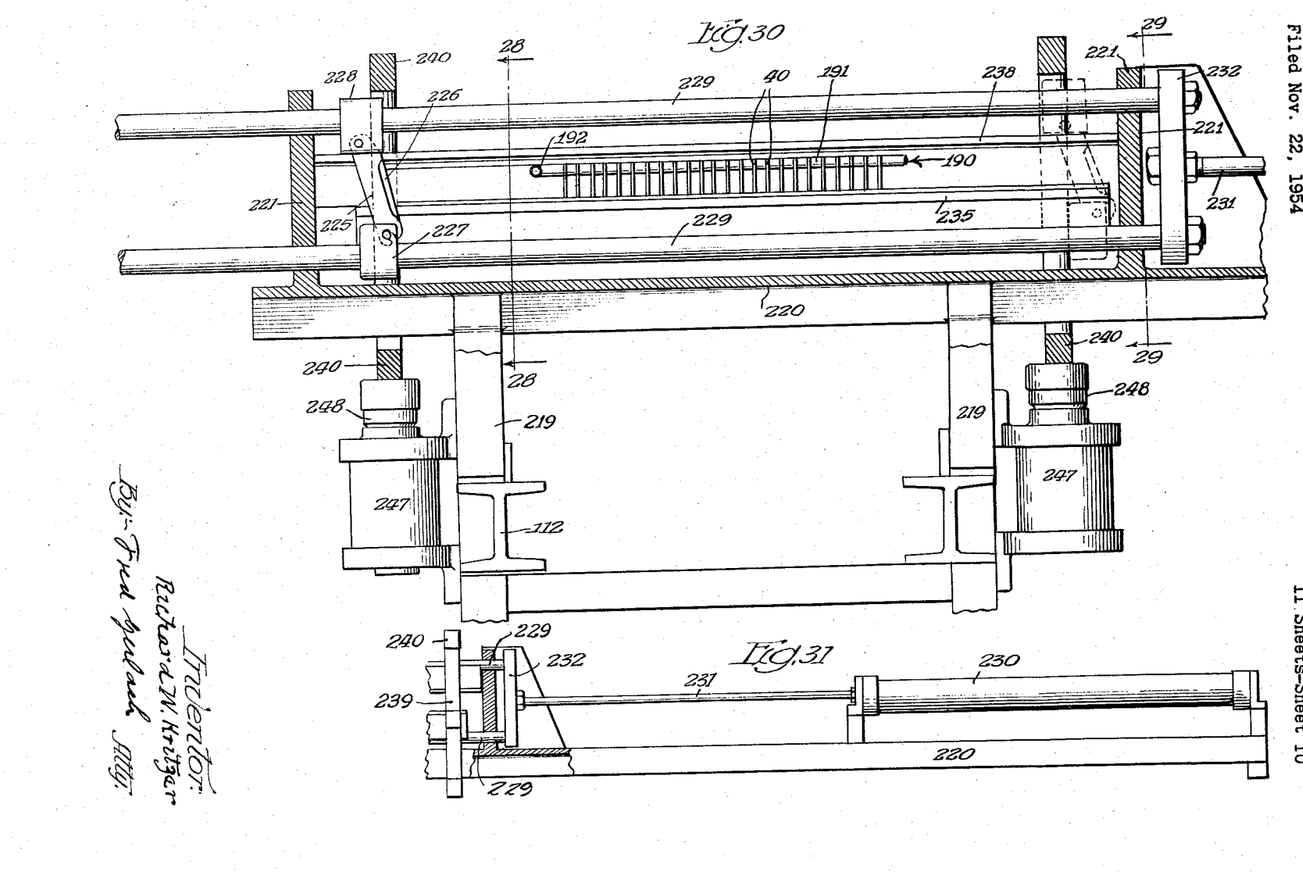
Fig. 30 is a section taken on line 30—30 of Fig. 28.
Fig. 31 is a view partly in section and partly in elevation of the means for reciprocating the cutter for severing lengths from the continuous strips.

*Mechanism for piercing the strips.*—The die structures 90 and 91, while in their coacting relation shown in Fig. 16 confine the strips 40 in the planar and spaced relation of the fins desired in fabricated heat transfer unit, are pierced and cut to form rows of open sided notches 155 intersecting the upper edges of strip 40, there being a row for each straight reach of the tubing in a complete coil. This piercing and cutting is done by a series of piercing spindles or tools 160 which pass transversely through the entire series of strips 40. These tools correspond in number to the number of rows of notches to be cut so that they will in a single operation cut all the notches necessary for an entire coil of tubing and heat transfer unit. These notches are open-sided and restricted at their intersections with the edge of the strips for an interlock with the tubing. As the strips are pierced by the cutting spindles, the stock of the strips in the cutaways is cut and bent to form around each opening or cutaway 155, a pair of integral upper tongues 156, a lower central tongue 157 and intermediate approximately triangular tongues 158. These tongues extend from one face of the strips 40 and are overlapped as illustrated in Fig. 27.

The mechanism for piercing and cutting the strips 40 comprises a series of spindles 160, one for each row of notches 155 and means for shifting the spindle to cut all the notches necessary in the fins of a complete transfer unit during each operation of said mechanism. The spindles 160 are slidable through a head 162 to move transversely through strips 40 coaxially with the circular die-openings formed by the mating notches 95 in die-plates 93 and notches 99.

Each spindle 160 has a terminal for cutting a notch 155 in succession through the series of strips 40 and bending tongues 156, 157 and 158 into overlapped relation around said opening. The terminal of each spindle 160 has a leading horizontal cutting edge 170 corresponding to the width of the tongue 157, and a longitudinally curved underface 171 which cuts the strip 40 to form the tongues 157. Each spindle 160 also has cutting edges 172 with curved underfaces 173 for cutting and bending the tongues 158. Each terminal also has a vertical cutting edge 175 with divergent sides 176 for cutting and bending the tongues 156.

Each spindle 160 has a spline 177 which slides in a groove 178 in head 161 and through aligned notches 179 which communicate with the notches 95 in die-plates 96 and in spacers 97 for preventing rotative movement of the spindle relative to die-plates 99 and 95 and uniformly locating the open-sides of notches 155 relatively to the upper edges of strips 40.

Mechanism for operating the series of spindles 160 to pierce the notches 155 and bend the surrounding tongues for a heat transfer unit comprises: a head 161 in which the outer ends of said spindles are fixed, a pair of hydraulic cylinders 165; pistons in said cylinders fixed to stems 166 which are connected to head 161. Cylinders 165 and head 162 are supported on a channel-beam 180 which is supported by legs 181 and an I-beam 182 which is supported on beams 112. A valve 167 controls the flow of hydraulic fluid from a pipe 168 which is connected to a suitable source of supply into the outer ends of cylinders 165 and the exhaust of fluid from the opposite ends of said cylinders for imparting operative strokes to the spindles for a piercing and bending operation. Valve 167 also controls the flow of hydraulic fluid from pipe 168 to the inner ends of said cylinders 165 for withdrawing the spindles from the die-plates 93 and 96 and the pierced strips.

Each outstroke of the series of spindles 160 pierces the entire series of strips 40 and bends the surrounding tongues to receive the complete coil of tubing for completing a unitary heat transfer unit. Each instroke of the spindle 160 withdraws them from the strips 40 and the tongues formed thereon and the die-structures.

Figure 18:
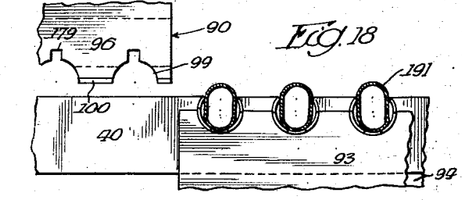
Fig. 18 is a detail section of portions of the die-structure, while the upper structure is retracted and a coil has been laid in the holes pierced in the strips of fin-stock.

*Assembling coils with the strips 40.*—After each piercing operation, the die-structure 90 is raised away from the die-structure 91, as illustrated in Fig. 17, to move the lower edges of die-plates 96 above the strips 40 which remain in die-structure 91 and is retracted to the position shown in Fig. 2. A coil of tubing for a complete heat transfer unit is next placed through the open top-sides of the notches 155 into the strips 40 in the position in which it is to be assembled for the heat transfer unit. A coil of tubing 190, including straight stretches 191 serially connected by integral bends 192, is next dropped sidewise into the notches or openings 155 in the strips 40 confined in the die-structure 91. The straight stretches 191 of the tubing are cross-sectionally deformed or narrowed, as shown in Fig. 18, to pass through the constricted tops of openings 155 and to seat on the tongues 157. The connecting bends 192 of the coil are disposed at the sides of the structure 91. After the coil has been thus placed in the openings in the strips 40, and in the notches 95 in the die-plates 93, the die-structure 91 is advanced so it will underlie the raised platen 92. Next, said platen is operated downwardly so its underface will engage the portions of the straight stretches 191 of the coil 190 which protrude above the edges of strips 40, flatten said straight stretches at 194 as shown in Fig. 19. This expands the stretches 191 laterally into close fit with the inner faces of the tongues 156, 157, and 158 and interlocks the strips 40 and the coil to secure them in assembled relation.

The platen 92 is carried by a pair of pistons 195 which are slidable in a pair of hydraulic cylinders 196 which are supported on cross-beams 110 and 111. The operation of the platen is controlled by a valve 197 which is adapted to control the flow of hydraulic fluid alternately to and from opposite ends of the cylinders 196 for imparting downstrokes to the platen 92 for deforming the tubing and upstrokes for retracting the platen above the strips 40 and the die-structure 91. Valve 197 is connected by a pipe 198 to the fluid supply and by a pipe 199 to return the fluid to said supply. Valve 197 in one of its positions will admit fluid from pipe 198 into the tops of cylinders 196 and exhaust the fluid in the upper ends of said cylinders through pipe 167 for imparting an operative stroke to the platen 92. In its alternative position, valve 197 will supply fluid from pipe 199 to the lower end of cylinders 196 and exhaust fluid from the upper ends of said cylinders to pipe 167 for imparting an upward retractile stroke to platen 92.

*Advancing mechanism for assembled coils and strips.*—The strips 40 are intermittently advanced as the coils of tubing are assembled therewith for using consecutive sections of the continuous strips 40 in the fabrication of the units. After each coil of tubing has been placed to rest on the bottom of notches 155 in the strips 40, and rests on tongues 157, the die-structure 91 is advanced to underlie the platen. During this advance, the interfit between the tongues 155 and 158 and the die-plates 93 and interfit between the reaches 191 of the coil and said tongues 156, will advance the strips 40 and the coil together and exert tension on the portions of the strips 40 trailing die-structure 91. This tension produces traction between the feed rolls 60 and 61 and the strips, and causes said feed-rolls to unwind and feed the strips 40 from reels 41 to table 50 as long as the die-structure 91 is advanced. The distance advanced during each forward stroke of structure 91 is equal to the length of the fins desired in the completed units, so that when said structure is retracted it will be positioned for piercing the strips 40 in the section thereof for the fabrication of a heat unit with fins from consecutive sections of the strips 40. After each operation of the platen 92 which locks the tubing in the notches 155 in the strips 40, it is necessary to retract the structure 91 independently of the strips 40 and the tubing to prevent backward travel of the strips and tubing. Mechanism is provided for lifting the tubing and the tongues on the strips out of notches 95 in die-plates 93 and for releasing the lower portion of strips 40 in the channels between the die-plates 93 so that structure 91 can be retracted independently of the strips 40 and the tubing.

Said mechanism comprises: a rear cross-bar 201 and a front cross-bar 202, each of which has a pair of vertical legs 203 which are slidably mounted for vertical movement by screws and slots 204 on the frame of the die-structure 91. Bars 201 and 202 normally or when lowered underlie the lower edges of strips 40 at the front and back of said structure and when lifted raise the strips 40 and the interlocked coil 190 until the stretches 191 of said coil are above and disengaged from notches 95 in die-plates 93, as illustrated in Fig. 20. The channels between die-plates 93 will then permit retraction of structure 91 to its normal position. When the die-structure 91 is fully retracted, the bars 201 and 202 are lowered, the lower edges of strips 40 resting on the spacers 94 between die-plates 93. During this retraction of die-structure 91, the strips 40 are secured against backward movement with said structure by means associated with the severing mechanism hereinafter described.

The mechanism for raising and lowering cross-bars 201 and 202 for stripping the tubing from die-structure 91 comprises: an air cylinder 210 supported on a cross-bar 211, a piston in said cylinder on a stem 212, a cross-bar 213 connected to said stem and a pair of bars 214 which are mounted to slide longitudinally in the frame 92 of the die-structure 91. Bars 214 are provided with cam-slots 215 in which pins 216 on legs 203 are confined. The bars 214 and stem 213 are moved forwardly with the frame 97 of die-structure 91. When said frame is in its advanced position and stem 212 is operated by air admitted to the rear end of cylinder 210, bars 214 will slide, relatively to frame 92, and cam-slots 215 will operate pins 216 to raise the bars 201 and 202 and the portion of strips 40 in die-structure 91. When the die-structure 91 is fully retarded, stem 212 is operated to shift bars 214 in the frame 92 and lower the bars 201 and 202. The raised portions of strips 40 will then drop to the bottom of the channels onto the spacers 94.

*Apparatus for severing sections of fin lengths from continuous strips.*—The mechanism thus far described consecutively secures coils of tubing in the continuous strips 40 of fin-stock which are successively severed between the successive coils of tubing into lengths of the fins desired to complete the heat transfer units, by apparatus which comprises: a supporting structure which includes a transverse channel beam 220 which is supported on standards 219 and beams 112; standards 221 on beam 220; means for vertically gripping and horizontally guiding the series of strips 40; a knife or cutter 225 movable transversely across said strips; and apparatus for operating the knife while the strips are gripped.

The knife 225 with an inclined shearing edge 226 is mounted on collars 227 and 228, which are fixed on a pair of rods 229 which are slidable in standards 221 for shifting said knife transversely across the strips 40. Reciprocatory strokes are imparted to rods 229 and knife by a fluid pressure device which includes an air cylinder 230 for a piston on a stem 231 which is connected to a cross-head 232 which is secured to rods 229. The means for gripping the assembled strips and coils comprises, a lower member including a pair of vertically movable angle-bars 235 and 236, over which the lower edges of strips 40 are longitudinally slidable and a fixed upper member including angle-bars 237 under which the top edges of strips are movable. Knife 225 travels in spaces or slots between the bars 237 and between the bars 235 and 236. Bars 237 are fixed to and extend between standards 221. The bars 235 and 236 are fixed to collars 238 which are fixed to posts 239, which are cross-connected by bars 240 for conjoint vertical movement. The lower face of bars 237 are underlined with an elastic strip 241 and bar 236 has a similar top strip 242. When the lower bars 235 and 236 are raised, the strips 40 are gripped vertically to hold them against longitudinal and transverse movement during the retraction of die-structure 91 and during the cutting and retracting strokes of knife 225 across the strips 40. Spacer-plates 245 are secured in bar 235 for individually guiding the strips 40 and holding them in horizontally spaced relation during the cutting operation of knife 225.

Vertical reciprocating movement is imparted to bars 240, posts 239, collars 238 and bars 235 and 236 by apparatus which comprises: a pair of air cylinders 247 secured on outer sides of standards 219 and pistons in said cylinders on stems 248 which are operatively connected to the lower bars 240 on the lower gripping members 235 and 236. When compressed air is supplied to the lower ends of cylinders 247, bars 240, posts 239, collars 238 and bars 235 and 236 will be lifted and cause the strips 40 to be gripped vertically and held against longitudinal or transverse movement. This occurs during the severing and retractile strokes of knife 225 and the retractile stroke of die-structure 91.

Air to the cylinders 210 for shifting the stripper bars 214, to the cylinders 247 for operating bars 235 and 236 to grip and release strips 40, and to cylinder 230 for shifting the knife 225, is conjointly controlled by valve 250. When valve 250 is in one of its alternative positions, air will flow via a pipe 252 to the rear end of cylinder 210 for raising the stripper bars 214 to the lower ends of cylinders 247 for raising bars 235 and 236 to grip the strips 40, and to the inner end of cylinder 230 for imparting a cutting stroke to knife 225. A relief valve 253 is included in pipe 252 to delay the cutting stroke until the strips 40 have been gripped. When valve 240 is shifted to its other position, air will flow via a pipe 254 to the front end of cylinder 210 to lower the stripper bars 214, to upper ends of cylinders 247 to lower bars 235 and 236, and to the outer end of cylinder 230 for retracting knife 225, while air is exhausted from the opposite ends of said cylinders 210, 247 and 230.

A plate 260 is fixed to one side of frame 97' of die-structure 91, which slides in a groove 261 in head 162 (Fig. 22) for guiding said structure to keep the axes of spindles 160 and the notches 95 in die-plates 93 vertically aligned. A beam 264 is fixed to cross-beam 109 of the stationary frame to support die-structure 91 against lateral thrust during the piercing strokes of the spindles 160. A series of rollers 265 are supported to receive the units as they are severed from the continuous fin-and-coil structure.

The method of fabricating heat transfer units and the operation of the apparatus exemplifying the invention are as follows: Reels 41 with rolls of fin-stock wound thereon are mounted in hangers 52 and suspended side-by-side along and under both sides of the table 50. A sufficient number of loaded reels are provided to individually supply the stock for each of the fins in the predetermined heat transfer unit to be fabricated, or a number of rolls equal to the number of fins in each unit because a section is used from each strip 40 to provide the stock for the entire series of fins. The arrangement of the reels is advantageous because a large number thereof can be accessibly and compactly disposed for units with a large number of fins. A greater number of reels may be provided, the lesser number being shown for clarity in illustration. The leading ends of strips 40 are pulled from reels 41 at both sides of table 50 over feed-rolls 60 and 61 onto the top of table 50 to the rollers 63 which impart a quarter twist to the strips 40 so they will be guided and travel edgewise and individually to the die-structure 90. The strips 40 are spaced apart horizontally by the extensions 102 on plates 96 of die-member 90, and individually guided into the channels between plates 93 in die-structure 91. In starting a run, the leading ends of strips 40 are advanced at least to the front end of die-structure 91. Valve 150 is then set to supply compressed air to the rear end of cylinder 136 and operate stem 140, rod 141 and cross-head 126 forwardly until the die-structures are vertically aligned. Springs 129 will hold posts 127 and die-structure 90 raised until the notches 99 in die-plates 96 and notches 95 are vertically aligned and then the stops 144 will arrest the die-structure 90 and posts 127 while the notches 95 and 99 are in vertical alignment. Limited further forward movement of cross-head 126 by connecting rod 141, will cause cam-slots 131 to force pins 130 and the posts rectilinearly downwardly until the lower edges of die-plates 96 are in abutting relation with the upper edges of die-plates 93 and the notches 99 and 95 are mated to form circular female die-surfaces, as illustrated in Fig. 16. The notches 99 and 95 extend in rows across the die-plates with a row for each straight reach 191 in the complete coil of a heat transfer unit. The bends 192 between said reaches are adapted to be positioned at the sides of the die-structures so that a complete coil can be laid in the pierced strips of the die-structure 91. The spindles 160 are sufficient in number to simultaneously pierce the entire series of strips 40 to receive sidewise all of the straight reaches 191 of the complete coil, each spindle being movable through a row of mating notches 99 and 95 in the die-structures when they are in coacting relation, as shown in Fig. 16. Spindles 160 are slidably supported for reciprocatory movement through the portions of strips 40 confined in areas in the notches 99 and 95, and coaxially with the axes of the rows of said mated notches. While the strips 40 are confined between the die-structures, as shown in Fig. 16, a stroke is imparted to head 161 and the entire series of spindles 160 to force the cutting and bending surfaces on their leading ends, through the entire series of strips 40, by setting valve 167 to deliver hydraulic fluid into the outer end of cylinders 165, and then reversing the fluid to retract head 161 and spindles 160 from the die-structures. During each outstroke of spindles 160, they will pass successively through the circular openings formed by mated notches 99 and 95 and the area of the strips 40 extending across said openings, and pierce the upper edges of the strips 40 and produce notches 155 therein which are in the form of major circular sectors and bend the tongues 156, 157 and 158 around said notches in the entire series of strips 40 for a complete coil of tubing. The spindles are correlated with the strips 40 so that they will intersect the upper edges of said strips and constrict the top of the openings 155 for interlock with the tubing. This operation includes the following cycles: each horizontal cutting edge 170 first slits a strip 40 to form a tongue 157; curved surface 171 bends said tongues transversely of the strip; cutting edges 172 slit the stock at the sides of tongues 157 for the top edge of triangular tongues 158; curved surfaces 173 bend the tongues 158 transversely; the vertical cutting edge 175 severs the upper margin of the strip for tongues 156; flared sides 176 bend the vertically severed upper marginal portions transversely to form the tongues 156. Each spindle 160 successively pierces the strips 40 and cuts and bends the tongues to surround notch or opening 155 in the entire series of strips. When the strips 40 are in close relation, the tongues on the strips overlap the tongues on contiguous strips. The notches or openings 155 along the upper edge of the strips are constructed for interlocking the strips and tubing. During this cutting and bending operation, the spline 177 on each spindle 160 slides through notches 179 in die-plates 96, and prevents rotation of said spindle so that the openings 155 will be cut and the surrounding tongues will be bent in the same relation to the upper edges of the strips 40 for uniformity.

When the entire series of strips has been pierced and bent to form the tongues, a retractile stroke is imparted to spindles 160 which withdraws them from the die-structures and the strips by reversing, at valve 167, the flow of hydraulic fluid to the cylinders 165 and retracting stems 166 until the leading ends of spindles 160 are completely withdrawn from the die-structures and the strips 40. Next, the die-structure 90 is raised vertically above the strips 40 and retracted to its normal position rearwardly of die-structure 91. Valve 150 is set to deliver air into the front end of cylinder 136 to retract rod 141 and cross-head 126. The initial retractile movement of cross-head 126 will cause cam-slots 131 to permit springs 129 to lift posts 127 and raise the die-structure 90 so that the lower edges of die-plates 96 will clear the upper edges of strips 40 and notches 99 will be spaced vertically from the tongues 156 on the strips 40. The die-structure 90 will then be free for horizontal retractile movement over the die-structure 91 into the position shown in Figure 2 into which it is shifted by the cross-head 126, connecting rod 141 and air admitted to the front end of cylinder 136. The straight reaches 191 of a complete coil of tubing 190 is then placed sidewise into the notches 155 and on the surrounding tongues in the zones of strips 40 which are confined between the die-plates 93. The connecting bends 192 of the coils are disposed outside of die-structure 91. The straight reaches of the coil of tubing may be deformed or narrowed as shown in Fig. 18 so they will pass sidewise through their constricted upper ends of notches 155 and seat on the tongues 157. This exemplifies assembly of a complete coil of tubing and the portions of the strips 40 of fin-stock for forming a complete heat transfer unit.

Figures 32, 33, 34:
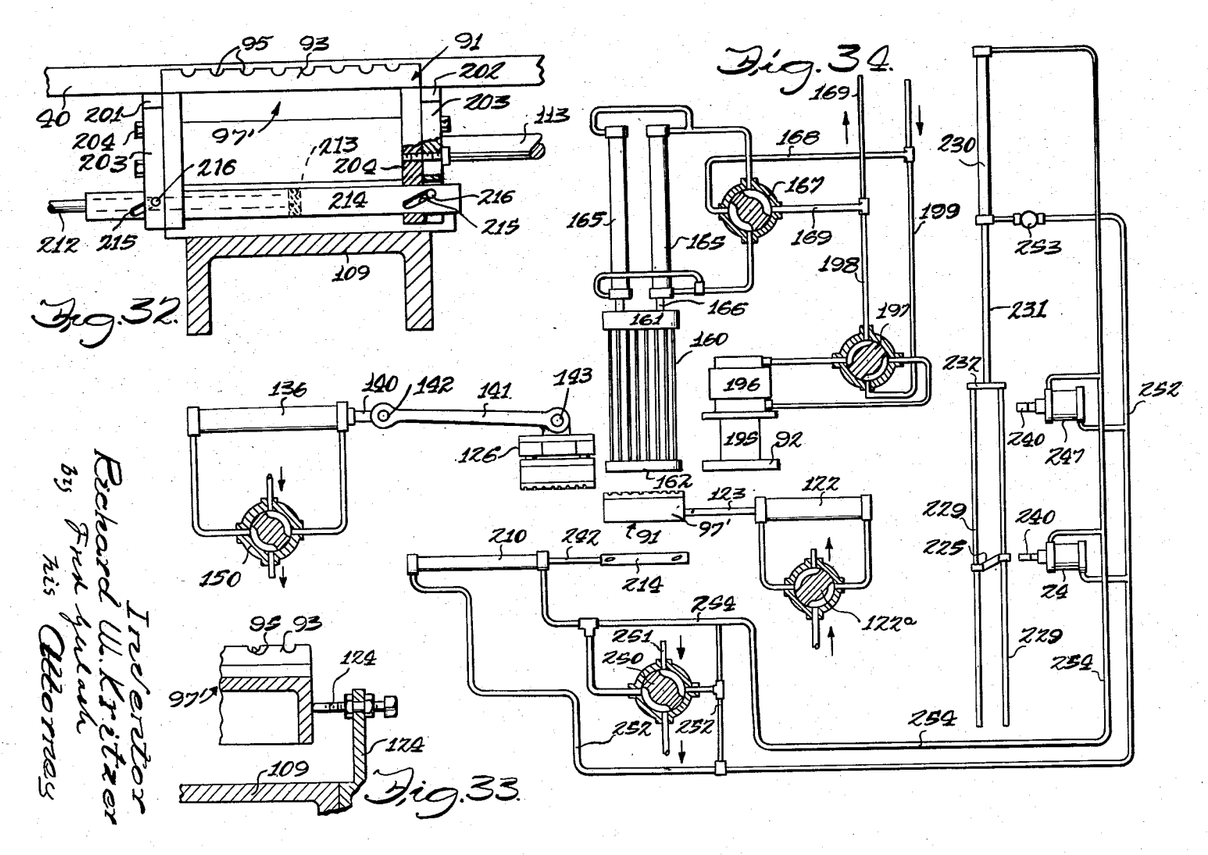
Fig. 32 is a side elevation, parts being shown in section, of the device for stripping the assembled strips and coils from the lower die-structure and releasing it for retraction relatively to said assemblies into position for a succeeding piercing operation.
Fig. 33 is a section taken on line 33—33 of Fig. 4 showing the stop for the lower die-structure.
Fig. 34 is a diagrammatic view of the fluid pressure operable apparatus for imparting strokes to the die-structure, the platen for securing the tubing in the strips, the piercing tools, the stripper device, the cutter, and the gripping means for the strips.

Next, the die-structure 91 is advanced to underlie the platen 92 and to advance the series of strips 40 for positioning succeeding zones of the strips for the next piercing operation. The straight reaches 191 of the coil 190 are disposed in the notches 155 in the strips and on the tongues 158 and 157 and are held in the notches 95 in die-plates 93, so that the strips and tubing will be advanced with the die-structure 91. Valve 122a is set to supply air to the rear end of cylinder 122 and operate stem 123 to advance the die-structure 91 until it is arrested by stops 124 (Fig. 33). The structure 91 will then underlie the platen 92 and the entire series of strips will have been advanced a distance equal to the length of the fins in the completed unit. As the die-structure 91 is advanced, it exerts a pull on all of the strips 40 which produces traction between said strips and the feed-rolls 60 and 61 and feeds the strips from reels 41 to the table 50 from which the die-structure will advance the strips. The driving mechanism for rolls 60 and 61 may be continuously operated, but will feed the strips intermittently with the advance of die-structure 91. This exemplifies intermittently advancing the entire series of strips for the fins in the unit and a coil of tubing, a distance equal to the length of the fins, for fabricating units from consecutive zones of the continuous strips.

Next, the straight reaches 191 of tubing are deformed into close thermal contact with the inner faces of tongues 156, 157 and 158 and for transversely interlocking the tubing and strips. Valve 197 is set to supply hydraulic fluid to the upper ends of cylinder 196 which will operate pistons 195 and platen 92 downwardly. The platen, as shown in Fig. 19, will flatten the tops of the reaches 191 of the tubing and spread its sides into a tight fit with the surrounding tongues. This exemplifies securing the strips and tubing for a complete unit in a single operation. The platen 92 is then retracted upwardly by reversing the hydraulic fluid in cylinder 196 through valve 197.

The die-structure 91 is retracted to its position for a succeeding piercing operation for the next unit. This retraction is independent of the strips 40 in order to position the die-structure 91 for the next piercing operation on the trailing portions of the strips 40. To permit this retraction, it is necessary to raise the tubing and surrounding tongues out of notches 95 in the die-plates 93, as shown in Fig. 20. This lifting of the strips and tubing is effected by the stripper bars 201 and 202 which underlie the strips 40 at the rear and front ends of frame 97 of the die-structure (Fig. 32). When valve 250 is set to admit compressed air to the rear end of cylinder 210, stem 212 will shift cross-bar 213 and bars 214 to cause cam-slots 215 to lift pins 216, legs 203 and bars 201 and 202 until the strips 40 and tubing secured therein are clear of the die-plates 93, as shown in Fig. 20. The structure 91 will then be retractable independently of the strips 40 and the tubing therein. During their retraction, the sides of the upper portions of the die-plates 93 will slide along strips 40. After the die-structure 91 is retracted, the reversal of air in cylinder 210 will shift bars 214 to lower the stripper bars 201 and 202 so the strips will gravitate onto the spacer-bars 94 between die-plates 93.

Each series of cycles of the operation described, produces from consecutive sections or zones of the continuous strips of fin-stock, an assembly of a complete coil of tubing and cross-fins interlocked therewith for a heat transfer unit. These operations are successively repeated and produce a continuous fin-and-coil structure from which sections are severable for the production of individual heat transfer units, each including a complete coil and cross-fins secured together for thermal conduction. The invention provides for serially severing sections from the continuous structure into such units.

Figure 21:
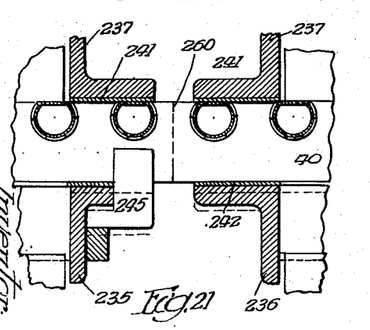
Fig. 21 is a section taken on line 21—21 of Fig. 30 showing the strips gripped to prevent their longitudinal movement.
Figure 22:
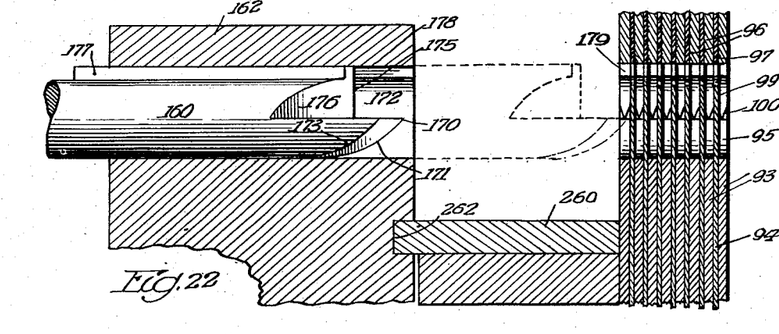
Fig. 22 is a longitudinal section on an enlarged scale showing the strips held in the die-structures and the piercing spindle at the commencement of an operative stroke.

From the die-structure 91 and platen 92, the continuous assembled structure passes to the apparatus for severing sections therefrom to form the individual units. The leading end of the continuous structure passes, when a sufficient length of the structure has been assembled, onto the vertically movable bars 235 and 236, as shown in Fig. 28, and is slidable thereover during the intermittent advances by the die-structure 91 from the position in Fig. 18 or Fig. 2 to the position shown in Fig. 19 before the platen 92 is lowered. Each advance of the continuous structure is equal in distance to the length of the fins in a unit, so that during each cycle of operations, the structure will be advanced so that strips 40 will be cut for the fins in a unit. The severing mechanism is operated in coordination with each assemblying operation to cut off a unit from the continuous structure. Prior to the retraction of the die-structure 91, the bars 235 and 236 on which the continuous structure rests, are raised to jamb the structure against the upper fixed bars 237 and prevent retraction of the structure. Simultaneously, the stripper-bars 201 and 202 are raised to permit retraction of die-structure 91 independently of the continuous structure. While the continuous structure is thus gripped between upper bars 237 and lower bars 235 and 236, as shown in Fig. 22, an operative stroke is imparted to knife 225 across the strips 40 between adjacent coils of tubing and a section forming a complete heat transfer unit, is severed at 260 (Fig. 21) from the leading end of the continuous structure. The valve 250 controls air in cylinder 210 for the operation of the stripper-bars 201 and 202, air to the cylinders 247 for operating bars 235 and 236 to clamp the structure, and air in cylinder 230 for operating the knife 225. Valve 122a is controlled to retract the die-structure 91 while the continuous structure is gripped between bars 237 and the bars 235 and 236, to prevent retractile movement of the continuous structure with die-structure 91 which is retracted while said structure is so gripped. The relief valve 253 relays air to cylinder 230 for the operation of the knife 225 until the continuous structure is gripped.

As an exemplification of the achievements of the invention, rolls or strips 40 of fin-stock, each 5000 feet in length, are loaded on the reels 41. The arrangement of the reels and the feed-mechanism lend themselves to supplying strips equal to the number of cross-fins in a completed heat transfer unit without labor, after the leading ends of the strips are secured for intermittent advance by one of the die-structures. Assuming that fins one foot in length are to be used, the rolls of fin-stock are adequate for the consecutive production of 5000 heat units before it is necessary to replenish the supply of fin-stock or interrupt the operation of the apparatus. The successive cycles of each operation while producing a section for a complete unit, such as piercing and bending the strips, placing a complete coil in the lower die-structure, deforming the tubing to interlock the tubing and strips, and severing the sections from the fin-and-coil structure, are performed in close succession to expedite the fabrication. The die-structure 91 is retracted during the severing cycle. The cycles for each operation may be consecutively performed and there is no waste of fin-stock. The use of continuous strips of fin-stock eliminates the time and labor involved in placing pre-cut fins in a die-structure, and this is particularly advantageous when the fins are great in number and in closely spaced relation. The piercing of the strips 41 with notches surrounded by tongues, and the deformation of the tubing against the contiguous faces of the tongues provides efficient thermal conduction between the tubing and the fins. The use of fluid pressure operated devices for shifting the die-structures, the piercing spindles, the stripper-bars and the knife for severing the strips, expedites their operative cycles for a high rate of production. The apparatus for gripping the fin-and-coil structure during the severing cycle, functions to prevent retraction of the fin-and-coil structure, while the die-structure 91 is retracted for piercing the succeeding portion of the strips. The piercing spindles are guided to uniformly cut and bend the entire series of strips 40 with respect to their adjacent edges.

The invention is not to be understood as limited to the details set forth, since these may be modified within the scope of the appended claim without departing from the scope and spirit of the invention.

Having thus described the invention, what I claim as new and desire to secure by Letters Patent is:

Apparatus for securing serpentine tubing units having reach sections which are oval in cross section in fin stock comprising; a work holder for supporting a plurality of strips of such fin stock in parallel spaced relationship and including spacer members extending from the tops to the bottoms of the strips, die members formed in the top edges of the spacer members and arranged in transverse axial alignment, said die members being of circular configuration slightly in excess of 180°, punch means movable through said die members to perforate the fin stock strips and produce in the top edges thereof aligned circular notches which are in the form of major circle-sectors, said notches being adapted to have loosely positioned therein the straight reach sections of the tubing units, and a pressing platen mounted above said work holder and movable between an elevated position out of contact with a tubing unit in the notches and a lowered position wherein it engages and forces the reach sections of the tubing unit against the bottom of the notches to expand the tubing and secure the same in the notches.

References Cited in the file of this patent
UNITED STATES PATENTS

| | | |
|---|---|---|
| 891,516 | Abery | June 23, 1908 |
| 1,044,283 | Stanger | Nov. 12, 1912 |
| 2,057,244 | Maynes | Oct. 13, 1936 |
| 2,224,549 | O'Brien | Dec. 10, 1940 |
| 2,475,187 | Kramer | July 5, 1949 |
| 2,558,952 | Hayward | July 3, 1951 |
| 2,634,974 | Chuy | Apr. 14, 1953 |
| 2,685,362 | Larsen | Aug. 3, 1954 |
| 2,688,178 | Boyd | Sept. 7, 1954 |
| 2,761,195 | Hayward et al. | Sept. 4, 1956 |